(12) United States Patent
Ito et al.

(10) Patent No.: US 6,428,880 B1
(45) Date of Patent: Aug. 6, 2002

(54) PASTE GOLD AND GOLDEN ORNAMENTS

(75) Inventors: Koichi Ito; Katsushi Sugita, both of Nagoya (JP)

(73) Assignee: Narumi China Corporation, Nagoya (JP)

(*) Notice: Subject to any disclaimer, the term of this patent is extended or adjusted under 35 U.S.C. 154(b) by 0 days.

(21) Appl. No.: 09/700,705

(22) PCT Filed: May 27, 1999

(86) PCT No.: PCT/JP99/02833

§ 371 (c)(1),
(2), (4) Date: Jan. 19, 2001

(87) PCT Pub. No.: WO99/61260

PCT Pub. Date: Dec. 2, 1999

(30) Foreign Application Priority Data

May 27, 1998 (JP) .......................................... 10-145880

(51) Int. Cl.⁷ ........................... C03C 17/10; B32B 3/12; B32B 15/00; A47G 19/00
(52) U.S. Cl. ........................ 428/209; 428/210; 428/434; 428/542.2; 428/672; 106/1.13; 106/1.18
(58) Field of Search ................................. 428/209, 210, 428/434, 542.2, 672; 106/1.13, 1.18

(56) References Cited

U.S. PATENT DOCUMENTS

| | | | | |
|---|---|---|---|---|
| 5,273,947 A | * | 12/1993 | Ochiai | |
| 5,783,310 A | * | 7/1998 | Sano et al. | |
| 5,972,483 A | * | 10/1999 | Sano et al. | |
| 6,071,332 A | * | 1/2000 | Schulz et al. | |

FOREIGN PATENT DOCUMENTS

| JP | 54-022420 | 2/1979 |
|---|---|---|
| JP | 55-051776 | 4/1980 |
| JP | 55-056079 | 4/1980 |
| JP | 62-017092 | 1/1987 |
| JP | 62-138379 | 6/1987 |
| JP | 2-036558 | 8/1990 |
| JP | 3-003481 | 1/1991 |
| JP | 8-012475 | 1/1996 |
| JP | 8-011697 | 2/1996 |
| JP | 8-183682 | 7/1996 |
| JP | 9-235169 | 9/1997 |

\* cited by examiner

*Primary Examiner*—Deborah Jones
*Assistant Examiner*—Jason Savage
(74) *Attorney, Agent, or Firm*—Oblon, Spivak, McClelland, Maier & Neustadt, P.C.

(57) ABSTRACT

A gold paste for painting glass or a ceramic, exhibits gold color by being sintered. The gold paste comprises metal components having a metal composition within the following range: gold 82.0–99.1% by weight, bismuth 5.0–0.4% by weight, silicon 3.0–0.2% by weight, and the total amount of zirconium and/or aluminum 10.0–0.3% by weight.

According to this, it is possible to provide a gold paste making it possible to form a gold-decorated portion which does not generates conductivity, neither generates spark nor is damaged even if it is exposed to a microwave that a microwave oven emits, is good in a massive feel and development of gold color, and has high-class feeling; and a gold-decorated product using this paste.

17 Claims, 2 Drawing Sheets

PASTE GOLD AND GOLDEN ORNAMENTS

TECHNICAL FIELD

The present invention relates to a gold paste for painting a golden pattern on the surface of a ceramic or the like, and a gold-decorated product, using this paste.

BACKGROUND ART

In considerable cases, ceramics are subjected to golden painting. Gold decoration is widely used since it supplies a beautiful pattern to ceramics and has a high-class feeling.

Such gold decoration is formed by applying and sintering a gold solution or a gold paste containing a noble metal compound to the surface of a ceramic with a brush, a spray or a decal.

About a gold decorating component used in gold decoration, JP-A-55-51776 and JP-A-55-56079 disclose pastes for painting wherein a lead-free frit is added to a noble metal compound. JP-B-8-11697 discloses a gold solution for painting, containing gold (Au), bismuth (Bi), barium (Ba), indium (In) and the like.

However, the action that a food is put on a ceramic and is cooked in a microwave oven has been becoming frequent as microwave ovens have been becoming popular in recent years. All of the above-mentioned gold decorating agents of the above-mentioned prior inventions exhibit conductivity if they are subjected to surface-polishing with sandpaper or the like. For this reason, if a microwave is generated in a microwave oven after the surface-polishing, the portion of gold decoration is locally heated so that heat-contrast shock may be caused. As a result, this portion may be damaged.

When the above-mentioned gold-decorated product is immersed into an evaporated and boiled alkali solution, insulation components in the noble metal are eluted out in the alkali solution so that its electrical insulation is broken down. When the gold-decorated product in this state is used in a microwave oven, spark maybe generated. That is, if the product is repeatedly washed with a washing scourer or an abrasive or washed in an a dish washer using a detergent having strong alkalinity, the electrical insulation of the noble metal film is broken down. As a result, spark is generated and the gold decoration is damaged when the gold-decorated product is irradiated with a microwave from a microwave oven.

If silicon or the like is incorporated into the noble metal to keep non-conductivity, gold color development property deteriorates to some extent.

Thus, the following techniques have been hitherto developed as gold decorating agents that can also be used in microwave ovens.

1) JP-B-3-3481 discloses a product having a noble metal decoration produced by sintering with a large number of minute plate-like elements, wherein intervals between the adjacent minute plate-like elements are set to 0.2 mm or more and the maximum size of the elements is set to 5 mm or less.

In the decoration with the net elements, however, spark may be generated at the time of use in a microwave oven if water adheres to the net elements so that the net elements are short-circuited each other and the net elements are injured.

2) JP-A-8-183682 discloses an decoration having a two-layer structure composed of a noble metal layer and a frit layer.

However, the noble metal layer exhibiting gold color is covered with the frit layer so that the layer exhibiting gold color is not directly seen but is seen through the frit glass layer. Thus, the massive feel of the golden decoration and development of gold color are poor.

3) JP-A-9-235169 discloses an decoration comprising plate-like elements of metal decoration, the intervals between the elements are defined within a given range; and a frit layer covering these elements.

However, the sizes of the plate-like elements are at most from about 8.5 mm to 12 mm. Therefore, continuous patterns and large-area patterns cannot be formed. Moreover, the plate-like elements are covered with the frit layer so that the layer exhibiting gold color is not directly seen but is seen through the frit glass layer. Thus, the massive feel of the golden decoration and development of gold color are poor.

As described above, various gold decorations resisting microwave ovens are suggested. However, they have not yet exhibited satisfactory performances.

In the light of the above-mentioned problems in the prior art, the present invention provides a gold paste making it possible to form a gold-decorated portion which neither generates spark nor is damaged even if this portion exhibits conductivity and is exposed to a microwave from a microwave oven, and which has a good massive feel, good gold color development property, and a high-class feeling.

DISCLOSURE OF THE INVENTION

The present invention relates to a gold paste for painting glass or a ceramic, exhibiting gold color by being sintered, and comprising metal components having a metal composition within the following range:

| | |
|---|---|
| gold | 82.0–99.1% by weight, |
| bismuth | 5.0–0.4% by weight, |
| silicon | 3.0–0.2% by weight, and |
| the total amount of zirconium and/or aluminum | 10.0–0.3% by weight | the total amount of zirconium and/or aluminum 10.0–0.3% by weight

The gold paste of the present invention comprises the metal components of gold (Au), bismuth (Bi), silicon (Si), zirconium (Zr), and aluminum (Al) at the following blend ratio.

Gold is contained in an amount of 82.0–99.1% in the metal components. (% means % by weight. This is the same hereinafter.) The gold paste comprising gold in such an amount exhibits gold color of a good massive feel by being sintered. On the other hand, if the amount is below 82.0%, there is a problem that color development property of the gold becomes poor and gold color of good massive feel is not exhibited. If the amount is over 99.1%, there are problems that conductivity is generated in the sintered gold paste and spark may be generated when the paste is exposed to a microwave from a microwave oven.

Gold is preferably contained in an amount of 90.6–99.1% in the metal components. If the amount is below 90.6%, gold color of the sintered gold paste may be slightly blacked.

Bismuth is contained in an amount of 5.0–0.4% in the metal components. This produces the following effects: the adhesion of the sintered gold paste to glass or ceramics is heightened and the conductivity of the sintered gold paste is lowered, so that spark is not easily generated even if the paste is exposed to a microwave from a microwave oven. On the other hand, if the amount is below 0.4%, there are problems that the adhesion of the sintered gold paste is lowered and the conductivity is heightened, so that spark may be generated if the paste is exposed to a microwave from a microwave oven. If the amount is over 5.0%, there is a problem that gold color development property of the sintered gold paste is poor.

Bismuth is preferably contained in an amount of 2.3–0.4% in the metal components. This causes the sintered gold paste to exhibit gold color having a particularly good massive feel. Besides, the conductivity thereof is lowered, so that spark is not generated even if the sintered paste is used in a microwave oven.

Silicon is contained in an amount of 3.0–0.2% in the metal components. This produces the effect that the conductivity of the sintered gold paste is lowered, so that spark is not easily generated even if the sintered paste is exposed to a microwave from a microwave oven. On the other hand, if the amount is below 0.2%, there are problems that the conductivity of the sintered gold paste is generated so that spark may be generated if the paste is exposed to a microwave from a microwave oven. If the amount is over 3.0%, there is a problem that the development of gold color becomes poor in the sintered gold paste so that the gold color may be slightly blacked.

Silicon is preferably contained in an amount of 1.5–0.2% in the metal components. This causes the sintered gold paste to exhibit gold color having a particularly good massive feel. Besides, the conductivity thereof is lowered, so that spark is not generated even if the sintered paste is used in a microwave oven.

The total amount of zirconium and/or aluminum is from 10.0 to 0.3% in the metal components. By this, the conductivity of the sintered gold paste is lowered, so that spark is not easily generated even if the sintered paste is exposed to a microwave from a microwave oven. If the total amount of zirconium and/or aluminum is below 0.3%, there are problems that the conductivity of the sintered gold paste is generated so that spark may be generated if the paste is exposed to a microwave from a microwave oven. If the amount is over 10.0%, there is a problem that the development of gold color becomes poor in the sintered gold paste so that the gold color may be slightly blacked.

The gold paste preferably contains 5.0% or less of zirconium in the metal components. If more than 5.0% of zirconium is contained, the development of gold color is poor in the sintered gold paste so that the gold color may be slightly blacked.

Furthermore, zirconium is desirably contained in an amount of 2.3–0.4% in the metal components. This causes the sintered gold paste to exhibit gold color having a particularly good massive feel. Besides, the conductivity thereof is lowered, so that spark is not generated even if the sintered paste is used in a microwave oven.

The gold paste preferably contains 5.0% or less of aluminum in the metal components. If more than 5.0% of zirconium is contained, the development of gold color is poor in the sintered gold paste so that the gold color may be slightly blacked.

Furthermore, aluminum is desirably contained in an amount of 2.3–0.3% in the metal components. This causes the sintered gold paste to exhibit gold color having a particularly good massive feel. Besides, the conductivity thereof is lowered, so that spark is not generated even if the sintered paste is used in a microwave oven.

As described above, the gold paste of the present invention comprises aluminum and/or zirconium. Therefore, when glass or a ceramic is painted with the gold paste and the gold paste is sintered so as to form a gold decorative pattern, conductivity is not exhibited even if the surface of the gold-decorated portion is polished. For this reason, even if the gold-decorated product after polishing is exposed to a microwave which a microwave oven emits, electrical conduction is not caused. Accordingly, the gold-decorated portion does not generate spark so that the gold decorative pattern is not damaged.

Even if the gold-decorated portion painted with the gold paste of the present invention is immersed into an alkali solution or an acidic solution, the electrical insulation of the gold-decorated portion is not broken down. Therefore, the electrical insulation of the gold-decorated portion can be kept even if the portion is subjected to alkali washing or washing based on surface-polishing. As a result, the portion can keep the property resisting a microwave oven, as described above.

Since the gold paste has electrical insulation as described above, it is unnecessary that a pattern is composed of plate-like elements as in prior arts. Therefore, it becomes possible to form a pattern having a large area. Furthermore, it is possible to form a linear pattern which is long extended. Accordingly, restriction on pattern design is free so that variety of patterns is wide.

Furthermore, the gold-decorated portion produced using the gold paste of the present invention exhibits mat gold, which has a particularly high-class feeling among gold colors, so that the portion looks nice.

Conventional gold decorations for microwave ovens are slightly black. Gold decorations wherein the surface of gold is covered with glass appear to exhibit poor massive feel and poor gold color by an effect of the glass coat.

However, the gold paste of the present invention exhibits high-class gold color. Moreover, the massive feel of gold and a tinge thereof can be seen as they are since no glass coat is necessary.

The gold paste preferably contains 10.0% or less of indium (In) in the metal components. By this, the following effect can be expected: indium interacts with zirconium and/or aluminum, so that the generation of conductivity is prevented and no spark is generated when the sintered gold paste is exposed to a microwave from a microwave oven. On the other hand, if more than 10% of indium is contained, the development of gold color of the sintered gold paste is poor and the gold color may be slightly blacked.

The indium content in the metal components is preferably from 0.1 to 3.0%. By this, gold color having a particularly good massive feel is exhibited and the generation of conductivity of the sintered gold paste can be suppressed.

The gold paste preferably contains 0.1–3.0% of rhodium (Rh) in the metal components. By this, the following effects can be expected: it is possible to prevent gold contained in the gold paste from becoming particulate and make the formation of a film of gold good. On the other hand, the metal components contains less than 0.1% of rhodium, it may be difficult that a good film is formed. If the metal components contains more than 3.0% of rhodium, conductivity may be generated in the sintered gold paste and gold color may be slightly blacked.

In the gold paste components of the above-mentioned gold paste, Au, Bi, Si, and at least one of Zr or Al are contained. If necessary, In and Rh are added to the gold paste. Besides these elements, Ba (barium), Ca (calcium), Cr (chromium), Sn (tin) or the like may be contained in the metal components.

The above-mentioned gold paste, for example, is a material prepared by making the above-mentioned metal components and a resin component into a paste state with a solvent. Examples of the resin component include natural resins such as rosin and balsam, or synthetic resins. The metal component may be contained in the gold paste as a conjugate with the resin component. Examples of such a conjugate include resin balsam sulphate and metal resinate. As the solvent, one or more of turpentine, camphor oil, safrole oil, eucalyptus oil, rosemary oil, butyl cellusolve and the like may be used.

The ratio between the resin and solvent in the gold paste varies dependently on blend of the components of the gold paste. It is preferred that the percentage of the resin component is 25–50% and the percentage of the solvent is 30–60% in 100% of the gold paste. By this, a gold paste which is suitable for printing and good in handling can be obtained.

The above-mentioned gold paste is preferably a gold paste for printing. By this, a gold paste suitable for use in screen printing can be obtained. For example, the gold paste may be printed on decal and then this may be transferred on glass or a ceramic. The gold paste may be directly printed on glass or a ceramic.

The above-mentioned gold paste may be used as a paste for brushing or for spraying.

Glass or ceramics painted with the above-mentioned gold paste are various. Uses thereof are also various. Examples thereof include tableware, interior decorations, earthenware pots, pots such as pots made of crystallized glass, and a turntable of a microwave oven. The use is not limited to these examples.

Examples of a gold decorative body made by using the above-mentioned gold paste include a gold-decorated product characterized in that a gold-decorated portion is formed by painting glass or a ceramic with the above-mentioned gold paste and then sintering the resultant.

The gold-decorated portion comprises the above-mentioned gold paste. Therefore, spark is not generated and gold color having a high-class feeling is exhibited even if the gold-decorated portion is exposed to a microwave from a microwave oven.

The metal components of the gold-decorated portion preferably have the same composition as the metal components contained in the above-mentioned gold paste. By this, the generation of spark can be suppressed most effectively at the time of use in a microwave oven, and beautiful gold color having a high-class feeling can be exhibited.

The gold-decorated portion may make a golden continuous pattern. In this case, the gold-decorated portion keeps electrical insulation. As a result, spark is not generated even if this portion is exposed to a microwave from a microwave oven. Examples of the continues pattern include a linear pattern, a belt pattern and a whole-painted pattern. The continuos pattern is not limited to these examples.

The gold-decorated portion may be made into a discontinuous pattern.

BEST MODES FOR CARRYING OUT THE INVENTION

Gold pastes according to embodiments of the present invention were used to produce various gold-decorated products, and various experiments (1)–(5) were conducted. The compositions of the various gold pastes are shown in Table 1, and test results of the gold-decorated products produced using these pastes are shown in Table 2.

(1) Microwave Oven Resistant Test (Before Polishing)

a) Preparation of Various Kinds of Gold Pastes

First, the following blend components were prepared.
① Gold resin balsam sulfide containing 25% of Au
② Bismuth resinate containing 9% of Bi
③ Silicon resinate containing 25% of Si
④ Zirconium resinate containing 4% of Zr
⑤ Aluminum resinate containing 5% of Al
⑥ Rhodium resinate containing 5% of Rh
⑦ Indium resinate containing 8% of In
⑧ Barium resinate containing 5% of Ba
⑨ Au powder The above-mentioned respective blend components ①–⑨ were mixed in the manner that the ratio of the metal components would be values shown in Table 1. A solvent (for example, turpentine oil) was appropriately added thereto, so as to prepare 6 kinds of gold pastes. These were used as samples 1–6. The order that the respective blend components were mixed was freely available.

For comparison, as shown in Table 1, in the same way as in samples 1–6 the respective blend components ①–③, ⑥, ⑦ and ⑨ were mixed. A solvent (for example, turpentine oil) was appropriately added thereto, so as to prepare 3 kinds of gold pastes. These were used as samples A, B and C.

TABLE 1

| Metal Component | Sample 1 | Sample 2 | Sample 3 | Sample 4 | Sample 5 | Sample 6 | Sample A | Sample B | (weight %) Sample C |
|---|---|---|---|---|---|---|---|---|---|
| Au* | 93.1 | 94.9 | 94.4 | 95.5 | 82.7 | 85.0 | 96.5 | 93.8 | 82.0 |
| Rh |  |  |  | 0.3 | 0.3 | 0.5 | 0.3 | 0.4 |  |
| Bi | 2.2 | 1.6 | 2.5 | 1.4 | 3.6 | 4.0 | 2.0 | 3.2 | 3.4 |
| Zr | 0.9 | 2.6 |  | 0.9 | 4.3 | 4.5 |  |  |  |
| Si | 2.3 | 0.9 | 1.5 | 1.1 | 2.8 | 2.5 | 1.2 | 2.1 | 5.8 |
| Al | 1.5 |  | 1.6 | 0.4 | 3.8 | 3.5 |  |  |  |
| In |  |  |  | 0.4 | 2.5 |  |  | 0.5 | 8.8 |

*: Au contains the gold resin balsam sulfide of ① and Au powder of ⑨.

b) Production of Gold-decorated Products

Figure 1:
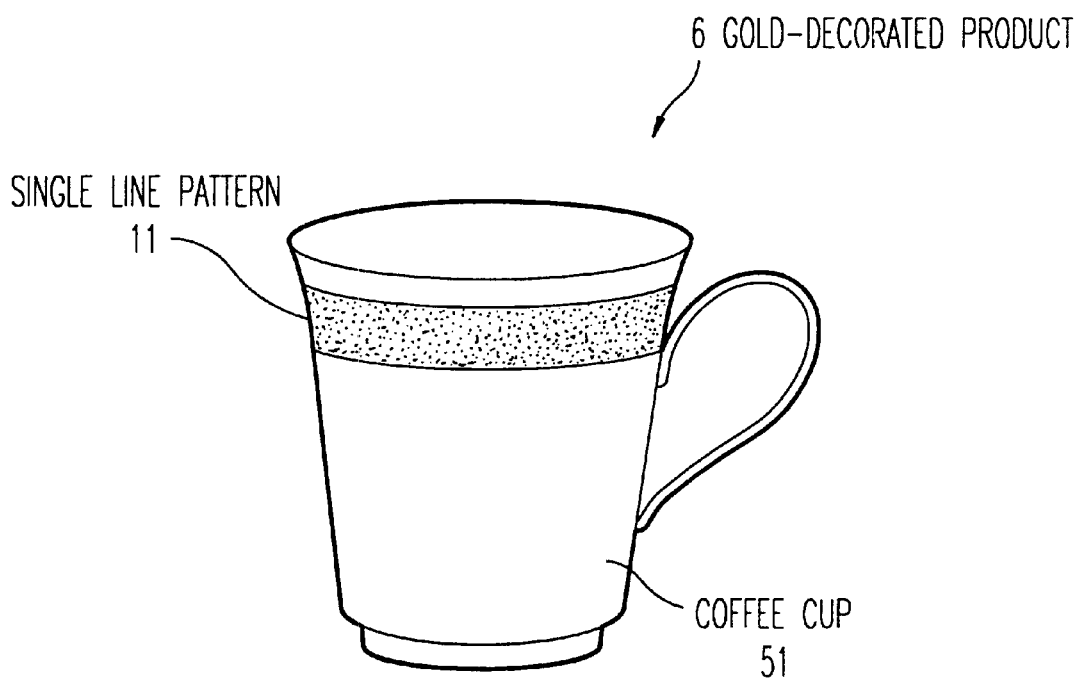
FIG. 1 is a perspective view of a gold-decorated product in tests (1) and (2) of embodiments.

The gold pastes (samples 1–6 and samples A–C) were printed on decals. As shown in FIG. 1, each of them was adhered to the side face of a coffee cup 51 made of bone china to form a single line pattern 11 of about 8 mm in width. Thereafter, this was sintered at 800° C. to obtain a gold-decorated product 6, which exhibited mat gold color.

c) Enforcement of a Microwave Oven Resistant Test

Without the gold-decorated portions of the above-mentioned respective coffee cups being polished, the cups were put, as they were, into a microwave oven so that the cups were exposed to a microwave having a power of 1.4 KW for 10 seconds. At this time, no spark was generated from the gold-decorated portions of the gold-decorated products, wherein the samples 1–6 were used. On the other hand, spark was generated from the samples A and B.

Under the same conditions, the test was repeated 10 times. From the gold-decorated portions of the samples 1–6, no spark was generated so that the gold-decorated portions were not damaged.

(2) Microwave Oven Resistant Test/after Polishing)

Concerning the gold-decorated products, which were produced using the gold pastes of the above-mentioned samples 1–6 and A–C in the same way as in the experiment (1), their gold-decorated portions were sufficiently polished with zircon sandpaper. The conductivity of the polished surfaces was measured with a tester. As a result, the conductivity of the samples 1–6 was not recognized, but the conductivity of the samples A, B and C was recognized.

Thereafter, the samples were irradiated with a microwave (2450 MHz) having a power of 1.4 KW. No spark was generated from the samples 1–6. On the other hand, spark was generated from the samples A, B and C.

About the samples 1–6, the same test was carried out 10 times. In all of the tests, no spark was generated.

It was understood from this fact that even if gold-decorated products wherein the gold paste of the present invention is used are polished, spark is not generated.

(3) Microwave Oven Test After Acid-resistance

Figure 2:
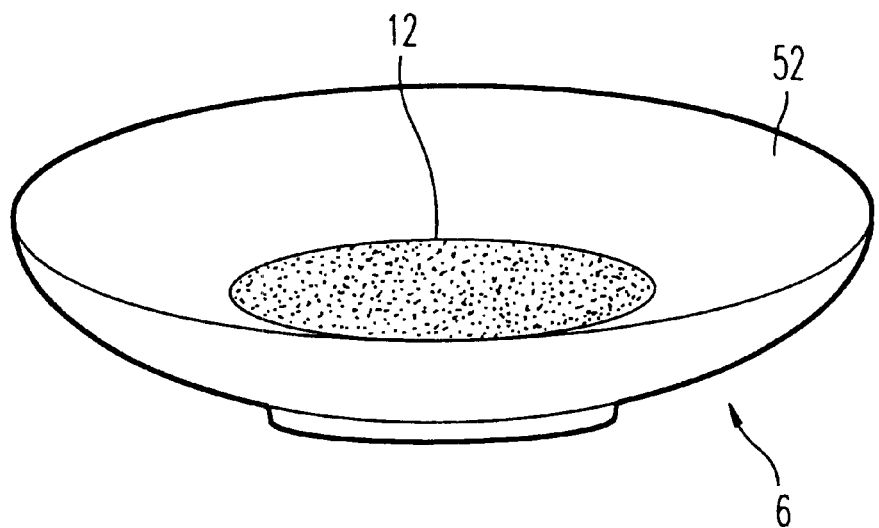
FIG. 2 is a perspective view of a gold-decorated product in test (3) and (4) of embodiments.

As shown in FIG. 2, each of the gold pastes of samples 1–6 and A–C was used to form a whole-painted pattern 12 having a diameter of 100 mm at the center of a dish 52 having a diameter of 160 mm in the same transfer method as in the above-mentioned experiment (1). Thereafter, the dish was sintered at 800° C. to obtain a gold-decorated product 6 exhibiting mat gold color.

4% solution of acetic acid was put into the resultant gold-decorated product, so that the gold decoration was immersed. The product was allowed to stand still inside a room at 22° C. for 24 hours.

Thereafter, the gold-decorated product was washed and then put into a microwave oven so that the product was exposed to a microwave having a power of 1.4 KW for 10 seconds. As a result, the gold-decorated portions of the samples 1–6 according to the present invention were not damaged. On the other hand, the gold-decorated portions of the samples A and B according to comparative examples were damaged.

(4) Acid-Resistance Test and Washing Tableware

Next, the gold-decorated products subjected to the acid-resistance test (3) were put into a tableware washing machine for business use, and washed 100 times with an alkali washing agent. Thereafter, the products was exposed to a microwave under the same conditions as in the acid-resistance test. As a result, the gold-decorated portions of the samples 1–6 according to the present invention were not damaged. On the other hand, the gold-decorated portions of the samples A, B and C according to comparative examples were damaged.

(5) Gold Color Measurement

Next, color development property of the gold-decorated products was measured. Gold color was measured by using a color-difference meter (OFC-31 type, made by Nippon Denshoku Industries Co., Ltd.). The color development property was judged on the basis of L, a and b values. As the measured values are large, developed color is more vivid and better. That is, as the L, a and b values become larger, brightness, tinge of red and tinge of yellow become larger, respectively. Therefore, as the L, a and b values become larger, color is better as gold color. In this test, the color in which the total of the L, a and b values is 50 is used as standard gold color. (L+a+b)/50 is used as a value of color development property. As this value is 1 or more and becomes larger, gold color development property is better.

Samples subjected to the measurement were various coffee cups produced in the (1).

Results of the measurement demonstrated that the samples 1–6 according to the present invention had a (L+a+b)/50 of 1.6–2.1 and exhibited high-class gold color. On the other hand, the sample C for comparison had a (L+a+b)/50 of 0.9 and its gold-decorated portion exhibited blackish and purplish gold color.

It was understood from the above-mentioned measurement results that the gold-decorated portions made from the gold pastes of the samples 1–6 of the present invention generated no spark at the time of use in the microwave oven and exhibited superior gold color. On the other hand, it was understood that the samples A and B for comparison exhibited good gold color but had conductivity to generate spark and the sample C generated a slightly small amount of spark but exhibited poor development property of gold color.

TABLE 2

| Item of test | Sample 1 | Sample 2 | Sample 3 | Sample 4 | Sample 5 | Sample 6 | Sample A | Sample B | Sample C |
| --- | --- | --- | --- | --- | --- | --- | --- | --- | --- |
| Microwave oven resistant test (before polishing) | ○ | ○ | ○ | ○ | ○ | ○ | X | X | ○ |
| Microwave oven resistant test (after polishing) | ○ | ○ | ○ | ○ | ○ | ○ | X | X | X |
| Microwave oven test after acid-resistance | ○ | ○ | ○ | ○ | ○ | ○ | X | X | ○ |
| Acid-resistance test + washing tableware | ○ | ○ | ○ | ○ | ○ | ○ | X | X | X |
| Gold color measurement | 2.0 | 2.0 | 2.0 | 2.1 | 1.6 | 1.7 | 2.3 | 2.2 | 0.9 |

○: Spark is NOT generated, X: Spark is generated

INDUSTRIAL APPLICABILITY

As described above, according to the present invention, it is possible to provide a gold paste making it possible to form a gold-decorated portion, which does not generates conductivity, neither generates spark nor is damaged even if it is exposed to a microwave that a microwave oven emits, is good in a massive feel and development of gold color, and has high-class feeling; and a gold-decorated product using this paste.

What is claimed is:

1. A gold paste for painting glass or a ceramic, exhibiting gold color by being sintered and being characterized by comprising metal components having a metal composition within the following range:

| | |
|---|---|
| gold | 82.0–99.1% by weight, |
| bismuth | 5.0–0.4% by weight, |
| silicon | 3.0–0.2% by weight, and |
| the total amount of zirconium and/or aluminum | 10.0–0.3% by weight. |

2. The gold paste according to claim 1, characterized in that the gold paste comprises 5.0% or less by weight of zirconium in the metal components.

3. The gold paste according to claim 2, wherein the gold paste comprises 5.0% or less by weight of aluminum in the metal components.

4. A gold-decorated product, wherein painting glass or a ceramic with the gold paste according to claim 3 and sintering the gold paste to form a gold-decorated portion.

5. The gold-decorated product according to claim 4, wherein a gold-decorated portion makes a golden continuous pattern.

6. The gold paste according to claim 1, characterized in that the gold paste comprises 5.0% or less by weight of aluminum in the metal components.

7. The gold paste according to claim 1, characterized in that the gold paste comprises 10.0% or less by weight of indium in the metal components.

8. The gold paste according to claim 7, characterized in that the gold paste comprises 0.1–3.0% by weight of rhodium in the metal components.

9. A gold-decorated product, characterized by painting glass or a ceramic with the gold paste according to claim 8 and sintering the gold paste to form a gold-decorated portion.

10. The gold-decorated product according to claim 9, characterized in that the gold-decorated portion makes a golden continuous pattern.

11. A gold-decorated product, characterized by painting glass or a ceramic with the gold paste according to claim 7 and sintering the gold paste to form a gold-decorated portion.

12. The gold-decorated product according to claim 11, characterized in that the gold-decorated portion makes a golden continuous pattern.

13. The gold paste according to claim 1, characterized in that the gold paste comprises 0.1–3.0% by weight of rhodium in the metal components.

14. A gold-decorated product, characterized by painting glass or a ceramic with the gold paste according to claim 13 and sintering the gold paste to form a gold-decorated portion.

15. The gold-decorated product according to claim 14, characterized in that the gold-decorated portion makes a golden continuous pattern.

16. A gold-decorated product, characterized by painting glass or a ceramic with the gold paste according to claim 1 and sintering the gold paste to form a gold-decorated portion.

17. The gold-decorated product according to claim 16, characterized in that the gold-decorated portion makes a golden continuous pattern.

* * * * *